United States Patent

[11] 3,628,584

| [72] | Inventor | Charles E. Gutshall<br>Roselle, Ill. |
|---|---|---|
| [21] | Appl. No. | 886,319 |
| [22] | Filed | Dec. 18, 1969 |
| [45] | Patented | Dec. 21, 1971 |
| [73] | Assignee | Illinois Tool Works Inc.<br>Chicago, Ill. |

[54] SPRING WASHER
8 Claims, 8 Drawing Figs.

| [52] | U.S. Cl. | 151/38 |
|---|---|---|
| [51] | Int. Cl. | F16b 39/24 |
| [50] | Field of Search | 151/38, 37 |

[56] References Cited
UNITED STATES PATENTS

| 1,961,470 | 6/1934 | Winchester et al. | 151/38 |
|---|---|---|---|
| 2,679,880 | 6/1954 | Poupitch | 151/37 |
| 2,734,547 | 2/1956 | Hotchkin | 151/38 |

*Primary Examiner*—Edward C. Allen
*Attorneys*—Olson, Trexler, Wolters & Bushnell, Robert W. Beart, Michael Kovac, Barry L. Clark and Jack R. Halvorsen ABSTRACT: The present invention relates generally to spring-type washers, namely; washers which depend for their locking characteristics upon the yieldability or resiliency of the washer body structure when tightened beneath a screwhead or nut. The present application discloses an embodiment of the invention which includes an annular washer body comprising inner and outer marginal sections which are substantially conical in axial cross section. The inner section extends axially outwardly beyond the first section and the periphery thereof defines a multisided structure in the form of a polygon which is spaced radially inwardly of the periphery of the outer marginal section. A circumferentially continuous, rigid strut section integrally joins the aforesaid inner and outer marginal sections of the annular body.

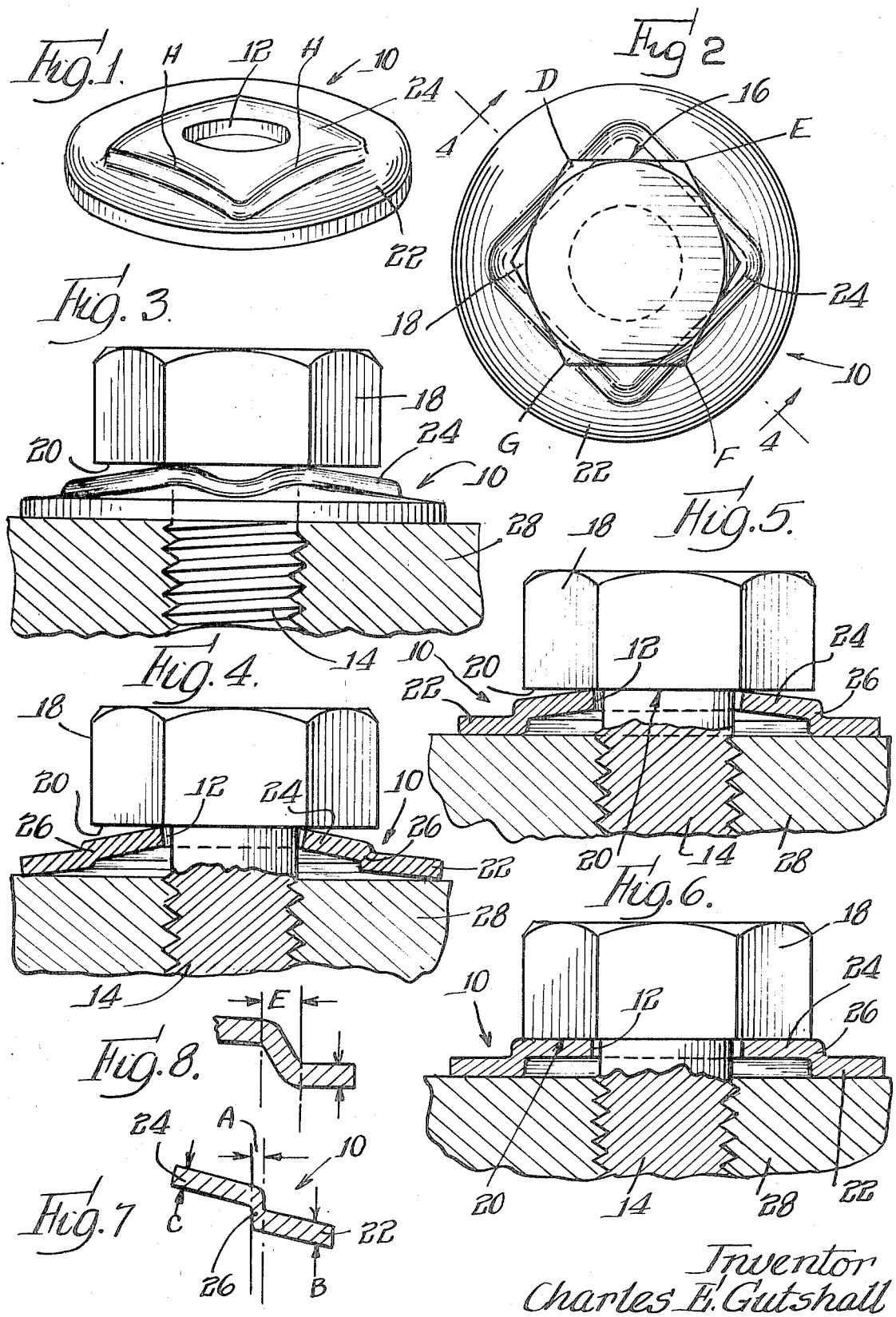

SPRING WASHER

Spring-type washers sometimes referred to as dished or conical washers have heretofore been employed to secure screwheads and nuts against loosening. If the washer stock is of relatively heavy gauge, excessive clamping force may be required to tighten a nut or screwhead against the washer. On the other hand, if the washer is of relatively light gauge, premature flattening of the washer may result when finally clamped against a work surface. It is an object of the present invention to provide an improved, highly efficient and novel spring-type washer which will enable the use of sheet metal stock of lighter gauge than is normally employed, without sacrificing but, in fact, increasing the locking effectiveness and strength of the washer member.

More specifically, the present invention contemplates a spring-type washer as set forth above, which has sufficient strength to yieldably resist initial tightening and thereafter provide a rigid abutment which will prevent complete flattening of the washer.

A spring-type washer constructed in accordance with the teachings of the present invention, even though formed from sheet metal material of less thickness than is conventionally employed, will resist the clamping action of a screwhead to such an extent that either the washer or screw will fracture before the washer is completely flattened.

Still more specifically, and for the purpose of accomplishing the above-mentioned advantages, the present invention contemplates the use in association with a conical-type washer structure a novel and highly practical and novel strut section integrally joining the inner and outer marginal sections of the washer.

The foregoing and other objects and advantages will be more apparent from the following detailed description when considered in connection with the accompanying drawing wherein:

FIG. 1 is a perspective view of a spring-type washer which is representative of one embodiment of the present invention;

FIG. 2 is a plan view of the washer of FIG. 1 shown in association with the clamping side of the hexagonal screwhead;

FIG. 3 is an enlarged front elevational view of the combined screw and washer shown in FIG. 2;

FIG. 4 is a central vertical sectional view taken substantially along the line 4—4 of FIG. 2, with the bolt or screw member shown in elevation, and also disclosing the spring washer upon initial contact therewith the clamping side of the bolt head and before a clamping force has been applied against the washer.

FIG. 5 is a vertical sectional view similar to FIG. 4, disclosing the washer during the initial or intermediate clamping of the screwhead against the washer, at which time the outer marginal section of the washer is flattened against the surface of the workpiece;

FIG. 6 is a view similar to FIGS. 4 and 5 disclosing the spring washer upon complete tightening of the bolt head against the washer, at which time a circumferential strut prevents further flattening of the washer element;

FIG. 7 is an enlarged fragmentary sectional view of the washer more clearly to illustrate the nature of the strut section which integrally joins the inner and outer marginal sections of the washer body; and, FIG. 8 is a fragmentary sectional view similar to FIG. 7 illustrating a conventional spring-type washer which does not incorporate the novel, continuous circumferential strut section of the present invention.

Referring now to the drawing wherein like numerals have been employed to designate similar parts throughout the various figures it will be seen that one embodiment of the invention includes an annular spring-type washer member designated generally by the numeral 10. Washer 10 has a central aperture 12 for accommodating a threaded shank 14 of a screw member designated generally by the numeral 16. The screw member or bolt 16, is provided with a hexagonal head 18 having a washer-clamping surface 20.

The spring washer 10 includes an outer annular section 22 and an inner annular section 24. The outer section 22 is substantially conical in axial cross section, the outer periphery thereof being circular. The washer section 24 extends axially outwardly, or upwardly beyond the upper limits of the section 22 and is also substantially conical in axial cross section. It will be noted that the outer periphery of the washer section 24 is polygonal in shape as distinguished from the circular periphery of the outer washer section 22, and is spaced radially inwardly from said circular periphery.

A circumferentially continuous abutment or strut section 26 integrally joins the washer section 22 and 24. Particular attention is directed to the structural characteristics and function of the strut section 26. It will be noted that the overall thickness of the strut section 26 as indicated by the letter A in FIG. 7, is less than the stock thickness of the washer section 22 as indicated by the letter B of FIG. 7, and also less than the thickness of the washer section 24 as indicated by the letter C in FIG. 7. In initially forming the sections 24 and 26 in the flat sheet metal stock, the sheet material is "die-ironed" as distinguished from conventional shearing or bending operations. In fact, as the material of the sheet metal stock is worked so as to impart the conical shape to the washer sections 22 and 24, the portion of the stock forming the integral connection 26 between the sections 22 and 24 is subjected to a partial shearing and partial forming or bonding operation. In so doing, the fibers of the steel are not broken as in shearing or bent only as in forming, but are compressed and elongated so as to impart substantial increase in strength to withstand compressive forces. As previously indicated, the overall width of the strut 26, designated by the letter A in FIG. 7, is actually less than the original thickness of the washer stock indicated by the letters B and C. Despite this decrease in strut thickness, the increase in strength imparted to the area occupied by the strut 26 more than compensates for the decrease in thickness.

As shown in FIG. 7, he above-described working of the material results in a relatively short strut, which in actual practice will not be substantially greater than nor less than the combined thicknesses B and C of the respective washer sections. The limited axial extent of strut 26 further enhances the rigidity of the washer.

FIGS. 4, 5 and 6 disclose successively the relative positions occupied by the washer sections 22, 24 relative 26, during the clamping thereof against the surface of a workpiece 28. Thus in FIG. 4 the clamping surface 20 of the bolthead is in initial nonclamping engagement with the outer surface of the polygonal washer section 24. Upon further tightening as indicated in FIG. 5, the outer section 22 is moved or flexed into flat-abutting engagement with the surface of the workpiece 28. Continued tightening of the screw member causes the washer marginal section 24 of flex or yield so as to assume the position shown in FIG. 6. In this position outer corners of the hexhead 18 superimpose the strut section 26. In FIG. 2 the corners of the bolthead 18 which superimpose the strut section are indicated by the letters D, E, F and G. This results from the fact that the dimension across the opposite flats of the hexhead 18 preferably approximates, or is slightly less than, the dimension across the opposite sides of the polygonal or square body section 24. Further tightening, after flattening peripheral conical section 22, causes the upper conical section 24 to flatten, but at a much higher load. For example, the outer conical portion 22 could flatten at 1200 lbs. while the upper conical portion 24 would require 2400 lbs. to assume a relatively flattened condition. These figures actually conform to the high- and low-limit torque settings on an assembly line employing this type of fastening. Should the tightening exceed the upper control limit, the strut 26 bears the brunt while still possessing an arched configuration as indicated by the letter H in FIG. 1. This further tightening may result in forces which will begin to or ultimately flatten said arch H, which still imparts a spring resistance characteristic in addition to the conical spring sections 22 and 24, but of much greater magnitude, usually approaching the designed breaking strength of the bolts; in this prescribed instance a resistance force of 4,000 lbs.

To illustrate more clearly the structural and functional difference of applicant's strut arrangement from a spring washer of conventional design reference is made to FIG. 8. FIG. 8 fragmentarily discloses a conventional spring-type washer and the letter E indicates the radial width of the washer section which integrally joins the inner and outer washer sections. It will be clear that the washer structure shown in FIG. 8 does not incorporate the rigid strut 26 previously described in connection with the washer 10, but rather a section which is substantially S-shaped in axial cross section. In fact the washer of FIG. 8 will ultimately flatten when subjected to clamping forces, or if the washer of FIG. 8 is formed from relatively heavy gauge stock, fracture of the washer stock may occur before the washer is completely flattened.

Extensive tests have substantiated the fact that a washer constructed with a strut arrangement of the type described herein will withstand without flattening or fracturing greater tightening pressures than conical-type spring washers of conventional design with which applicant is familiar. It has been shown, for example, that a conventional conical washer having a thickness of 0.50 inches will flatten at 900 lbs. pressure. A washer of corresponding thickness constructed in accordance with the teachings of the present invention will sustain 2,800 lbs. with no resulting damage to the washer. It has been common practice heretofore in some instances to produce conical-type spring washers from sheet metal stock having a thickness of 0.080 inches. By way of illustration and not limitation, attention is directed to the fact that comparative tests have proven that by employing washers of the type contemplated hereby, having a stock thickness of 0.050 inches and a strut width A of 0.030 inches, equal or greater-locking efficiency than the stock of 0.080 inches has been obtained. This represents a considerable savings in material without sacrificing locking efficiency.

From the foregoing it will be apparent that the present invention contemplates the provision of a novel, efficiently operable spring or conical-type washer which is economical to produce. Sheet metal of relatively lighter gauge, after having been clamped, will more readily return to its normal or original position than heavy gauge stock. In other words, heavy gauge material when subjected to clamping forces has a greater tendency to assume a permanent set than lighter gauge stock. Obviously, if the sheet material is too thin, the washer will not respond with sufficient yieldable resistance to assure the screwhead or nut against unauthorized loosening. Thus, the present invention makes practical the use of sheet material which is of sufficient thickness to assure effective resistance to the clamping action of a screwhead or nut, and to also assure the return or spring back of the washer stock to its normal original condition when released from clamping pressure. Furthermore, the presence of the polygonally shaped, circumferentially continuous rigid strut contributes materially in initially, yieldably resisting the tendency for the washer to become completely flattened, and in subsequently providing a rigid abutment.

The term "substantially conical" has been employed herein to describe the general axial cross-sectional shape of the polygonal washer section. Pyramidal-type washer bodies of certain designs may have a substantially conical cross-sectional shape.

By having the metal fibers of the strut section at the junction of the first and second washer sections extending substantially parallel to the washer axis the strength of the strut section to withstand heavy clamping pressures is greatly enhanced. As will be seen particularly from the disclosure in FIG. 7, the juncture of the upper surface of the first section with the strut section and the juncture of the under surface of the second section with the strut section are defined by fillets having an extremely small radius of curvature. This arrangement greatly enhances the rigidity of the strut section as compared with the spring washer of conventional design as shown in FIG. 8 wherein junctures of the washer stock present curvatures defined by relatively large radii. These curvatures, in the aggregate, present an S-shaped configuration. It will also be noted that applicant's improved washer contemplates that the radially inward extension of the lower surface of the first washer section 22, forms the lower extremity of the strut 26 and terminates in a curvature defined by an extremely small radius. Also the radially outward extension of the upper surface of the second section 24, forms the upper extremity of the strut section and likewise terminates in a curvature defined by an extremely small radius. These relatively sharp corners resulting from curvatures defined by very small radii together with the previously mentioned fillets greatly enhance the rigidity of the strut section. The strut section 26 in radial cross section is substantially rectangular in shape and forms a part of what might aptly be defined as a multisided annulus. In the illustrated structure this multisided annulus or ring is in the from of a square. In the drawing, the washer 10 is shown in preassembled association with a bolt. The outer diameter of the threads extends radially beyond the central aperture of the washer, thereby securing the washer and bolt against axial separation. Obviously the invention contemplates washer members having central apertures which are of sufficient diameter to permit telescopic association thereof with the complementary shank of a screw member.

I claim:

1. A spring-type washer including an annular washer body defining a central screw accommodating aperture, said body including a first circumferentially continuous outer marginal section which is substantially conical in axial cross section, a second circumferentially continuous inner marginal section which is substantially conical in axial cross section and extends axially outwardly beyond said first section, the periphery of said second section defines a polygon and is spaced radially inwardly of the periphery of said first section, and a short, rigid, strut section integrally joining said first and second sections, the fibers of the strut section at the juncture of the first and second washer sections extending substantially parallel with the washer axis.

2. A spring-type washer as set forth in claim 1, wherein the short, rigid, strut section has a radial thickness which is less than the thickness of the outer marginal washer section.

3. The spring-type washer as set forth in claim 1, wherein the periphery of the second section defines a square, the corners of which are spaced radially inwardly from the periphery of the first section.

4. A spring-type washer as set forth in claim 1, wherein the outer periphery of the first marginal section is substantially circular.

5. A spring-type washer as set forth in claim 1, wherein the strut has an axial height substantially equal to the combined thickness of each washer section.

6. A spring-type washer as set forth in claim 1, wherein the strut section defines an annulus having a multiside periphery, the upper and lower extremities of which are adapted respectively to be engaged by the clamping surface of a complementary rotary rotary threaded fastener, and a surface of a complementary workpiece.

7. A spring-type washer as set forth in claim 1, wherein the juncture of the upper surface of said first section with said strut section, and the under surface of the second section with said strut section are defined by fillets having a very small radius of curvature, whereby to enhance the rigidity of said strut section.

8. A spring-type washer as set forth in claim 1, wherein the radially inward extension of the lower surface of the first washer section forms the lower extremity of said strut section and terminates in a curvature defined by a very small radius, and the radially outward extension of the upper surface of the second section forms the upper extremity of the strut section and terminates in a curvature defined by a very small radius whereby to enhance the rigidity of said strut section.

* * * * *